United States Patent
Lee et al.

(10) Patent No.: US 12,189,416 B2
(45) Date of Patent: Jan. 7, 2025

(54) CLOCK GENERATING CIRCUIT AND CLOCK DISTRIBUTION NETWORK AND SEMICONDUCTOR APPARATUS INCLUDING THE CLOCK GENERATING CIRCUIT

(71) Applicant: SK hynix Inc., Icheon-si Gyeonggi-do (KR)

(72) Inventors: Yeon Ho Lee, Icheon-si Gyeonggi-do (KR); Yong Suk Choi, Icheon-si Gyeonggi-do (KR)

(73) Assignee: SK hynix Inc., Icheon-si Gyeonggi-do (KR)

( * ) Notice: Subject to any disclaimer, the term of this patent is extended or adjusted under 35 U.S.C. 154(b) by 21 days.

(21) Appl. No.: 18/094,227

(22) Filed: Jan. 6, 2023

(65) Prior Publication Data

US 2024/0085939 A1    Mar. 14, 2024

(30) Foreign Application Priority Data

Sep. 14, 2022  (KR) ......................... 10-2022-0115362

(51) Int. Cl.
*G06F 1/08* (2006.01)
*G06F 1/10* (2006.01)
*G06F 1/12* (2006.01)

(52) U.S. Cl.
CPC .................. *G06F 1/08* (2013.01); *G06F 1/10* (2013.01); *G06F 1/12* (2013.01)

(58) Field of Classification Search
CPC ........................................... H03K 2005/00039
See application file for complete search history.

(56) References Cited

U.S. PATENT DOCUMENTS

| 5,291,121 A * | 3/1994 | Neale ........................ G05F 1/56 323/907 |
| 5,731,727 A * | 3/1998 | Iwamoto ................ H03K 5/133 327/158 |
| 6,522,185 B2 * | 2/2003 | Helt ........................ H03K 5/133 327/158 |

(Continued)

FOREIGN PATENT DOCUMENTS

| KR | 101559501 B1 | 10/2015 |
| KR | 101727964 B1 | 4/2017 |
| KR | 102178623 B1 | 11/2020 |

OTHER PUBLICATIONS

Janet Heath, Unity gain amplifier or voltage follower in a voltage divider, May 5, 2017, Analog Ic Tips, https://www.analogictips.com/voltage-follower-unity-gain-amplifier-voltage-divider-faq/, accessed Mar. 20, 2024 (Year: 2017).*

(Continued)

*Primary Examiner* — Thomas J. Hiltunen
(74) *Attorney, Agent, or Firm* — WILLIAM PARK & ASSOCIATES LTD.

(57) ABSTRACT

A clock generating circuit includes a buffer circuit and a phase compensating circuit. The buffer circuit buffers an input clock signal to generate an output clock signal. The phase compensating circuit detects a noise in a power voltage and adjusts, according to the noise of the power voltage, a voltage level of the input clock signal to compensate for a phase change of the output clock signal due to the noise of the power voltage.

18 Claims, 7 Drawing Sheets

(56) References Cited

U.S. PATENT DOCUMENTS

| | | | | |
|---|---|---|---|---|
| 7,495,491 B2* | 2/2009 | Wu | H03K 5/1565 | 327/175 |
| 8,198,930 B2* | 6/2012 | Zerbe | G06F 1/10 | 327/158 |
| 8,710,889 B1* | 4/2014 | Chromczak | H03H 11/265 | 327/264 |
| 8,717,835 B2* | 5/2014 | Ma | G11C 7/222 | 327/158 |
| 8,779,822 B2* | 7/2014 | Ma | G11C 7/222 | 327/276 |
| 8,866,522 B1* | 10/2014 | Kim | H03L 7/0814 | 327/148 |
| 9,331,702 B2* | 5/2016 | Ma | H03L 7/0802 | |
| 10,833,662 B2* | 11/2020 | Kim | H03H 11/265 | |
| 11,132,015 B2* | 9/2021 | Asaki | G11C 7/222 | |
| 2012/0182057 A1* | 7/2012 | Ma | G11C 7/225 | 327/276 |

OTHER PUBLICATIONS

Amr Elshazly et al., A 2GHZ-to-7.5GHz Quadrature Clock-Generator Using Digital Delay Locked Loops for Multi-Standard I/Os in 14nm CMOS, 2014 Symposium on VLSI Circuits Digest of Technical Papers, Jun. 10, 2014.

Keunsoo Song et al., A 1.1 V 2y-nm 4.35 GB/s/pin 8 GB LPDDR4 Mobile Device With Bandwidth Improvement Techniques, IEEE Journal of Solid-State Circuits, vol. 50, No. 8, Aug. 2015, pp. 1945-1959.

Mozhgan Mansuri et al., A Low-Power Adaptive Bandwidth PLL and Clock Buffer With Supply-Noise Compensation, IEEE Journal of Solid-State Circuits, vol. 38, No. 11, Nov. 2003, pp. 1804-1812.

Narabaljeon, 1.4.7 Voltage & Current Reference Circuit-2, analog circuit design, Jul. 29, 2016, https://m.blog.haver.com/narabaljeon/220775045828.

* cited by examiner

CLOCK GENERATING CIRCUIT AND CLOCK DISTRIBUTION NETWORK AND SEMICONDUCTOR APPARATUS INCLUDING THE CLOCK GENERATING CIRCUIT

CROSS-REFERENCES TO RELATED APPLICATION

The present application claims priority under 35 U.S.C. § 119 a to Korean application number 10-2022-0115362, filed on Sep. 14, 2022, in the Korean Intellectual Property Office, which is incorporated herein by reference in its entirety as set forth in full.

BACKGROUND

1. Technical Field

Various embodiments generally relate to an integrated circuit technology, and, more particularly, to a clock generating circuit and a clock distribution network and a semiconductor apparatus including the clock generating circuit.

2. Related Art

An electronic device includes a lot of electronic elements and a computer system as the electronic device includes lots of semiconductor apparatuses each configured by a semiconductor. The semiconductor apparatuses configuring the computer system may perform data communication with each other by transmitting and/or receiving a clock signal and data. A first semiconductor apparatus may synchronize the data with the clock signal and may provide a second semiconductor apparatus with the clock signal and the data and the second semiconductor apparatus may receive the data in synchronization with the clock signal. According to a matched DQ-DQS scheme as a prior art, within the second semiconductor apparatus, the received clock signal and the received data may be delayed by the same delay time amount through a matched delay path and then the delayed clock signal and the delayed data may be synchronized with each other. The DQ may refer to the data and the DQS may refer to a data strobe signal. The data strobe signal may be the clock signal for transmitting and/or receiving the data. However, as the operation speed of the computer system increases, disclosed was an unmatched DQ-DQS scheme that is suitable for the high operation. According to the unmatched DQ-DQS scheme, although the clock signal and the data are separately delayed through different paths, the delay time can be adjusted through the training operation and therefore the clock signal and the data can be synchronized with each other. However, according to the unmatched DQ-DQS scheme, when the process, voltage and temperature (PVT) variation occurred due to the operational circumstance of the semiconductor apparatus, the clock signal was apt to have jitter or the delay time of the clock signal had an aptitude to vary and margins for the setup and hold became insufficient in the course of synchronizing the data with the clock signal.

SUMMARY

In an embodiment, a clock generating circuit may include a buffer circuit, a voltage control circuit, and a compensating circuit. The buffer circuit may be configured to buffer an input clock signal to generate an output clock signal. The voltage control circuit may be configured to detect a voltage level change of a power voltage and may be configured to generate a first control voltage and a second control voltage, the first control voltage and the second control voltage having varying voltage levels according to the detected voltage level change. The compensating circuit may be configured to adjust a phase of the input clock signal based on the output clock signal, the first control voltage, and the second control voltage.

In an embodiment, a clock generating circuit may include a first buffer circuit, a second buffer circuit, a voltage control circuit, and a compensating circuit. The first buffer circuit may be configured to buffer a first input clock signal to generate a first output clock signal. The second buffer circuit may be configured to buffer a second input clock signal to generate a second output clock signal. The second input clock signal may be a complementary clock signal of the first input clock signal. The voltage control circuit may be configured to detect a voltage level change of a power voltage and may be configured to generate a first control voltage and a second control voltage, the first control voltage and the second control voltage having varying voltage levels according to the detected voltage level change. The compensating circuit may be configured to change voltage levels of the first input clock signal and the second input clock signal based on the first output clock signal, the second output clock signal, the first control voltage, and the second control voltage.

In an embodiment, a clock generating circuit may include a buffer circuit, a voltage control circuit, and a compensating circuit. The buffer circuit may be configured to buffer an input clock signal to generate an output clock signal. The voltage control circuit may be configured to detect a voltage level of a power voltage, may be configured to generate a first control voltage having a voltage level, which complementarily changes with reference to the voltage level of the power voltage, and may be configured to generate a second control voltage having a voltage level, which complementarily changes with reference to the voltage level of the first control voltage. The compensating circuit may be configured to change a voltage level of the input clock signal based on the output clock signal, the first control voltage, and the second control voltage.

In an embodiment, a clock generating circuit may include a first buffer circuit, a second buffer circuit, a voltage control circuit, and a compensating circuit. The first buffer circuit may be configured to buffer a first input clock signal to generate a first output clock signal. The second buffer circuit may be configured to buffer a second input clock signal to generate a second output clock signal. The second input clock signal may be a complementary clock signal of the first input clock signal. The voltage control circuit may be configured to detect a voltage level of a power voltage, may be configured to generate a first control voltage having a voltage level, which complementarily changes with reference to the voltage level of the power voltage, and may be configured to generate a second control voltage having a voltage level, which complementarily changes with reference to the voltage level of the first control voltage. The compensating circuit may be configured to change voltage levels of the first input clock signal and the second input clock signal based on the first output clock signal, the second output clock signal, the first control voltage, and the second control voltage.

In an embodiment, a semiconductor apparatus may include a clock distribution network. The clock distribution network may include a clock receiving circuit, a first buffer circuit, a second buffer circuit, a phase compensating circuit, and a dividing circuit. The clock receiving circuit may be configured to receive an external clock signal and a complementary external clock signal to generate a first input clock signal and a second input clock signal. The first buffer circuit may be configured to buffer the first input clock signal to generate a first output clock signal. The second buffer circuit may be configured to buffer the second input clock signal to generate a second output clock signal. The phase compensating circuit may be configured to detect a voltage level change of a power voltage, may be configured to delay phases of the first input signal and the second input clock signal as the voltage level of the power voltage is raised and may be configured to advance the phases of the first input signal and the second input clock signal as the voltage level of the power voltage is lowered. The dividing circuit may be configured to divide the first output clock signal and the second output clock signal to generate a plurality of internal clock signals.

DETAILED DESCRIPTION

Figure 1:
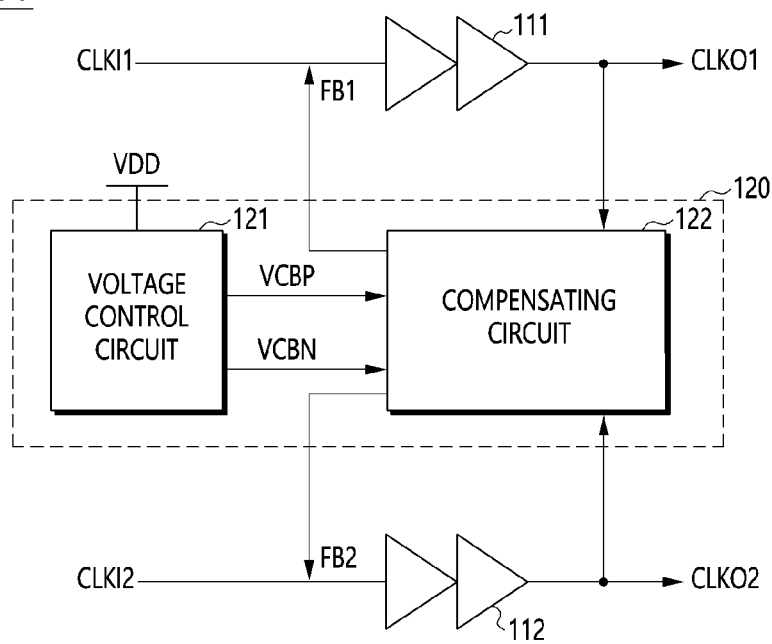
FIG. 1 is a diagram illustrating a configuration of a clock generating circuit in accordance with an embodiment.

FIG. 1 is a diagram illustrating a configuration of a clock generating circuit 100 in accordance with an embodiment. Referring to FIG. 1, the clock generating circuit 100 may receive at least one input clock signal and may output at least one output clock signal. The clock generating circuit 100 may compensate for change of the characteristics of the at least one output clock signal, the change being caused due to a noise of the power voltage VDD. The clock generating circuit 100 may adjust the phase of the at least one output clock signal by detecting the voltage level change of the power voltage VDD and by adjusting the voltage level and/or the phase of the at least one output clock signal according to the voltage level change of the power voltage VDD. The clock generating circuit 100 may receive a first input clock signal CLKI1 and a second input clock signal CLKI2 and may output a first output clock signal CLKO1 and a second output clock signal CLKO2. The second input clock signal CLKI2 may have an opposite phase to the first input clock signal CLKI1 and may be a complementary clock signal of the first input clock signal CLKI1. The second output clock signal CLKO2 may have an opposite phase to the first output clock signal CLKO1 and may be a complementary clock signal of the first output clock signal CLKO1.

The clock generating circuit 100 may include a first buffer circuit 111, a second buffer circuit 112 and a phase compensating circuit 120. Each of the first buffer circuit 111, the second buffer circuit 112 and the phase compensating circuit 120 may be operable based on the power voltage VDD. The first buffer circuit 111 may receive the first input clock signal CLKI1 and may buffer the first input clock signal CLKI1 to output the first output clock signal CLKO1. The second buffer circuit 112 may receive the second input clock signal CLKI2 and may buffer the second input clock signal CLKI2 to output the second output clock signal CLKO2.

The phase compensating circuit 120 may detect the voltage level of the power voltage VDD and may change the phases of the first input clock signal CLKI1 and the second input clock signal CLKI2 according to the voltage level change of the power voltage VDD. The phase compensating circuit 120 may delay the phases of the first input clock signal CLKI1 and the second input clock signal CLKI2 as the voltage level of the power voltage VDD is raised. The phase compensating circuit 120 may advance the phases of the first input clock signal CLKI1 and the second input clock signal CLKI2 as the voltage level of the power voltage VDD is lowered. For example, when the voltage level of the power voltage VDD reaches the vicinity of a target voltage level, the phase compensating circuit 120 may delay, by a reference delay amount, the phases of the first input clock signal CLKI1 and the second input clock signal CLKI2. The phase compensating circuit 120 may delay, by a greater amount than the reference delay amount, the phases of the first input clock signal CLKI1 and the second input clock signal CLKI2 as the voltage level of the power voltage VDD is raised higher than the target voltage level. The phase compensating circuit 120 may delay, by a less amount than the reference delay amount, the phases of the first input clock signal CLKI1 and the second input clock signal CLKI2 as the voltage level of the power voltage VDD is lowered lower than the target voltage level.

The phase compensating circuit 120 may perform the emphasis operation on the first input clock signal CLKI1 and the second input clock signal CLKI2 to adjust the phases of the first input clock signal CLKI1 and the second input clock signal CLKI2 and the phases of the first output clock signal CLKO1 and the second output clock signal CLKO2. The phase compensating circuit 120 may perform the emphasis operation on the first input clock signal CLKI1 and the second input clock signal CLKI2 by receiving, as feedback signals, the first output clock signal CLKO1 and the second output clock signal CLKO2 and by raising or lowering the voltage levels and/or amplitudes of the first input clock signal CLKI1 and the second input clock signal CLKI2. According to the voltage level change of the power voltage VDD, the phase compensating circuit 120 may adjust the emphasis strength to be exerted to the first input clock signal CLKI1 and the second input clock signal CLKI2 to adjust variances of the voltage levels of the first input clock signal CLKI1 and the second input clock signal CLKI2 through the emphasis operation. For example, when the voltage level of the power voltage VDD reaches the vicinity of the target voltage level, the phase compensating circuit 120 may perform the emphasis operation, with a reference strength, on the first input clock signal CLKI1 and the second input clock signal CLKI2 such that the voltage levels of the first input clock signal CLKI1 and the second input clock signal CLKI2 increase or decrease by a reference voltage level. As the voltage level of the power voltage VDD is raised higher than the target voltage level, the phase compensating circuit 120 may perform the emphasis operation, with a lesser strength than the reference strength, on the first input clock signal CLKI1 and the second input clock signal CLKI2. As a result, the voltage levels of the first input clock signal CLKI1 and the second input clock signal CLKI2 may increase or decrease by a lesser voltage level than the reference voltage level. As the voltage level of the power voltage VDD is lowered lower than the target voltage level, the phase compensating circuit 120 may perform the emphasis operation, with a greater strength than the reference strength, on the first input clock signal CLKI1 and the second input clock signal CLKI2. As a result, the voltage levels of the first input clock signal CLKI1 and the second input clock signal CLKI2 may increase or decrease by a greater voltage level than the reference voltage level.

The phase compensating circuit 120 may include a voltage control circuit 121 and a compensating circuit 122. The voltage control circuit 121 may detect the voltage level of the power voltage VDD. Based on the detected voltage level of the power voltage VDD, the voltage control circuit 121 may generate a first control voltage VCBN and a second control voltage VCBP. The voltage control circuit 121 may detect the voltage level change of the power voltage VDD and may change, according to the detected voltage level change of the power voltage VDD, the voltage levels of the first control voltage VCBN and the second control voltage VCBP. Variances of the voltage levels of the first control voltage VCBN and the second control voltage VCBP may be in proportional to the variance of the voltage level of the power voltage VDD. For example, the voltage control circuit 121 may generate the first control voltage VCBN having the voltage level, which complimentarily changes with reference to the voltage level of the power voltage VDD. The voltage control circuit 121 may generate the second control voltage VCBP having the voltage level, which complimentarily changes with reference to the voltage level of the first control voltage VCBN. As the voltage level of the power voltage VDD is raised, the first control voltage VCBN may have a lower voltage level and the second control voltage VCBP may have a higher voltage level. As the voltage level of the power voltage VDD is lowered, the first control voltage VCBN may have a higher voltage level and the second control voltage VCBP may have a lower voltage level. The voltage control circuit 121 may provide the compensating circuit 122 with the is first control voltage VCBN and the second control voltage VCBP.

The compensating circuit 122 may receive the first output clock signal CLKO1 from the first buffer circuit 111 and may receive the second output clock signal CLKO2 from the second buffer circuit 112. The compensating circuit 122 may receive the first control voltage VCBN and the second control voltage VCBP from the voltage control circuit 121. The compensating circuit 122 may change the phases of the first input clock signal CLKI1 and the second input clock signal CLKI2 based on the first output clock signal CLKO1, the second output clock signal CLKO2, the first control voltage VCBN and second control voltage VCBP. The compensating circuit 122 may adjust the phase of the first input clock signal CLKI1 by changing the voltage level of the first input clock signal CLKI1 based on the first output clock signal CLKO1, the first control voltage VCBN and the second control voltage VCBP. The compensating circuit 122 may generate a first feedback signal FB1 based on the first output clock signal CLKO1, the first control voltage VCBN and the second control voltage VCBP. The compensating circuit 122 may change the voltage level of the first input clock signal CLKI1 by providing the first feedback signal FB1 as the first input clock signal CLKI1. The compensating circuit 122 may adjust the phase of the second input clock signal CLKI2 by changing the voltage level of the second input clock signal CLKI2 based on the second output clock signal CLKO2, the first control voltage VCBN and the second control voltage VCBP. The compensating circuit 122 may generate a second feedback signal FB2 based on the second output clock signal CLKO2, the first control voltage VCBN and the second control voltage VCBP. The compensating circuit 122 may change the voltage level of the second input clock signal CLKI2 by providing the second feedback signal FB2 as the second input clock signal CLKI2.

The compensating circuit 122 may perform the emphasis operation on the first input clock signal CLKI1 by driving, with a strength determined according to the voltage levels of the first control voltage VCBN and the second control voltage VCBP, the first input clock signal CLKI1 according to the logic level of the first output clock signal CLKO1. The compensating circuit 122 may perform the emphasis operation on the second input clock signal CLKI2 by driving, with a strength determined according to the voltage levels of the first control voltage VCBN and the second control voltage VCBP, the second input clock signal CLKI2 according to the logic level of the second output clock signal CLKO2. In an embodiment, the compensating circuit 122 may adjust the phase of the first input clock signal CLKI1 based on the second output clock signal CLKO2 instead of the first output clock signal CLKO1. In an embodiment, the compensating circuit 122 may adjust the phase of the second input clock signal CLKI2 based on the first output clock signal CLKO1 instead of the second output clock signal CLKO2.

Figure 2:
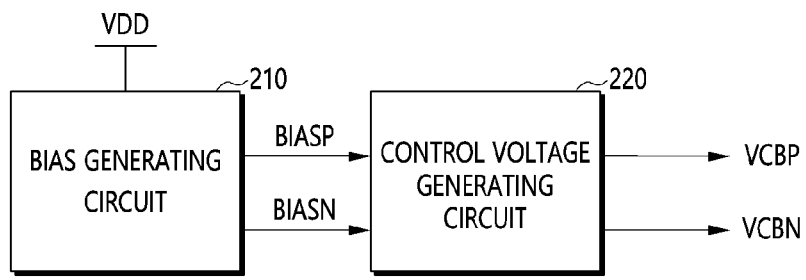
FIG. 2 is a block diagram illustrating a configuration of a voltage control circuit illustrated in FIG. 1.

FIG. 2 is a block diagram illustrating a configuration of the voltage control circuit 121 illustrated in FIG. 1. Referring to FIG. 2, the voltage control circuit 121 may include a bias generating circuit 210 and a control voltage generating circuit 220. The bias generating circuit 210 may generate a first bias voltage BIASN and a second bias voltage BIASP according to the voltage level of the power voltage VDD. The bias generating circuit 210 may generate the first bias voltage BIASN, which is independent from the voltage level of the power voltage VDD, and the second bias voltage BIASP, which depends on the voltage level of the power voltage VDD. The bias generating circuit 210 may generate the first bias voltage BIASN having a constant voltage level regardless of the voltage level change of the power voltage VDD. The bias generating circuit 210 may generate the second bias voltage BIASP having a varying voltage level according to the voltage level change of the power voltage VDD. The bias generating circuit 210 may be embodied by any circuit capable of generating a bias voltage depending on the change of the power voltage VDD and a bias voltage independent from the change of the power voltage VDD. For example, the bias generating circuit 210 may be embodied by a beta multiplier and may include any known beta multiplier.

The control voltage generating circuit 220 may receive the first bias voltage BIASN and the second bias voltage BIASP from the bias generating circuit 210. Based on the first bias voltage BIASN and the second bias voltage BIASP, the control voltage generating circuit 220 may generate the first control voltage VCBN and the second control voltage VCBP. The control voltage generating circuit 220 may detect the voltage level change of the power voltage VDD by detecting voltage level difference between the first bias voltage BIASN and the second bias voltage BIASP. The control voltage generating circuit 220 may change the voltage levels of the first control voltage VCBN and the second control voltage VCBP in proportional to the voltage level difference between the first bias voltage BIASN and the second bias voltage BIASP. The control voltage generating circuit 220 may complementarily change the first control voltage VCBN and the second control voltage VCBP.

For example, when the voltage level of the power voltage VDD maintains the target voltage level, the voltage levels of the first bias voltage BIASN and the second bias voltage BIASP may be substantially the same as each other. The control voltage generating circuit 220 may generate the first control voltage VCBN and the second control voltage VCBP each having a default voltage level.

When the voltage level of the power voltage VDD decreases and therefore is lower than the target voltage level, the voltage level of the second bias voltage BIASP may be lower than the voltage level of the first bias voltage BIASN. The control voltage generating circuit 220 may generate the first control voltage VCBN having a higher voltage level than the default voltage level and may generate the second control voltage VCBP having a lower voltage level than the default voltage level. An amount by which the voltage level of the first control voltage VCBN increases and an amount by which the voltage level of the second control voltage VCBP decreases may be in proportional to the voltage level difference between the first bias voltage BIASN and the second bias voltage BIASP.

When the voltage level of the power voltage VDD rises and therefore is higher than the target voltage level, the voltage level of the second bias voltage BIASP may be higher than the voltage level of the first bias voltage BIASN. The control voltage generating circuit 220 may generate the first control voltage VCBN having a lower voltage level than the default voltage level and may generate the second control voltage VCBP having a higher voltage level than the default voltage level. An amount by which the voltage level of the first control voltage VCBN decreases and an amount by which the voltage level of the second control voltage VCBP increases may be in proportional to the voltage level difference between the first bias voltage BIASN and the second bias voltage BIASP.

Figure 3:
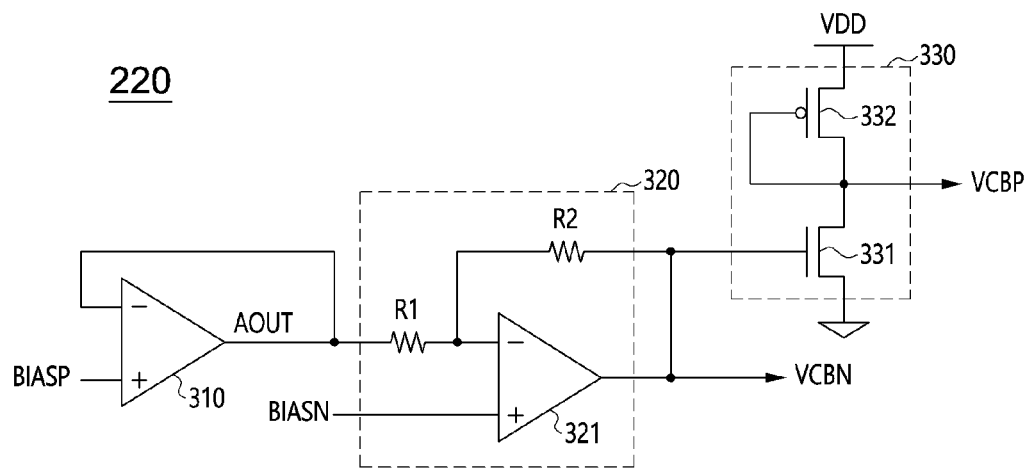
FIG. 3 is a block diagram illustrating a configuration of a control voltage generating circuit illustrated in FIG. 2.

FIG. 3 is a block diagram illustrating a configuration of the control voltage generating circuit 220 illustrated in FIG. 2. Referring to FIG. 3, the control voltage generating circuit 220 may include an amplifier 310, an inverting amplifier 320 and a voltage driver 330. The amplifier 310 may receive the second bias voltage BIASP at its positive input node "+" and may receive an output voltage AOUT at its negative input node "−". The amplifier 310 may amplify the voltage level difference between the second bias voltage BIASP and the output voltage AOUT to output the output voltage AOUT through its output node. The amplifier 310 may output the output voltage AOUT having substantially the same voltage level as the second bias voltage BIASP.

The inverting amplifier 320 may receive the first bias voltage BIASN at its positive input node "+" and may receive the output voltage AOUT at its negative input node "−". The inverting amplifier 320 may inversely amplify the voltage level difference between the first bias voltage BIASN and the output voltage AOUT to output the first control voltage VCBN through its output node. The inverting amplifier 320 may include a first resistor R1, a second resistor R2 and an amplifier 321. The first resistor R1 may be coupled to the output node of the amplifier 310 at one end thereof to receive the output voltage AOUT. The second resistor R2 may be coupled to the output node of the inverting amplifier 320 at one node thereof to receive the first control voltage VCBN. The amplifier 321 may receive the first bias voltage BIASN at its positive input node "+" and may be coupled commonly to the other ends of the first resistor R1 and the second resistor R2 at its negative input node "−".

The first control voltage VCBN generated from the inverting amplifier 320 may be determined according to Equation 1.

$$VCBN = -R_{R2}/R_{R1} \times (BIASP - BIASN) + BIASN \quad \text{[Equation 1]}$$

In Equation 1, '$R_{R1}$' may represent the resistance value of the first resistor R1 and '$R_{R2}$' may represent the resistance value of the second resistor R2. The ratio of the resistance value $R_{R2}$ of the second resistor R2 to the resistance value $R_{R1}$ of the first resistor R1 may be a factor for determining the degree of the voltage level change of the first control voltage VCBN. The resistance value $R_{R1}$ of the first resistor R1 may be a constant. The resistance value $R_{R2}$ of the second resistor R2 may variously change. As the resistance value $R_{R2}$ of the second resistor R2 is greater, the variance of the voltage level of the first control voltage VCBN corresponding to the voltage level change of the power voltage VDD may be greater even more.

The voltage driver 330 may receive the first control voltage VCBN and may generate the second control voltage VCBP based on the first control voltage VCBN. The voltage driver 330 may generate the second control voltage VCBP having the voltage level, which complementarily changes with reference to the voltage level of the first control voltage VCBN. The voltage driver 330 may include a first transistor 331 and a second transistor 332. The first transistor 331 may be a N-channel MOS transistor and the second transistor 332 may be a P-channel MOS transistor. The first transistor 331 may receive the first control voltage VCBN at its gate, may be coupled to a node, through which the second control voltage VCBP is output, at its drain and may be coupled to the ground voltage at its source. The second transistor 332 may be coupled to the node, through which the second control voltage VCBP is output, at both gate and drain thereof and may receive the power voltage VDD at its source. The second transistor 332 may be coupled in a form of diode between the power voltage VDD and the node, through which the second control voltage VCBP is output, and therefore the second transistor 332 may keep, to a certain level, the voltage level of the node, through which the second control voltage VCBP is output. According to the first control voltage VCBN, the first transistor 331 may adjust an amount of current running from the node, through which the second control voltage VCBP is output, to the ground voltage. As the voltage level of the first control voltage VCBN increases, the amount of current running through the first transistor 331 may increase and therefore the voltage level of the second control voltage VCBP may decrease. As the voltage level of the first control voltage VCBN decreases, the amount of current running through the first transistor 331 may decrease and therefore the voltage level of the second control voltage VCBP may increase.

Figure 4:
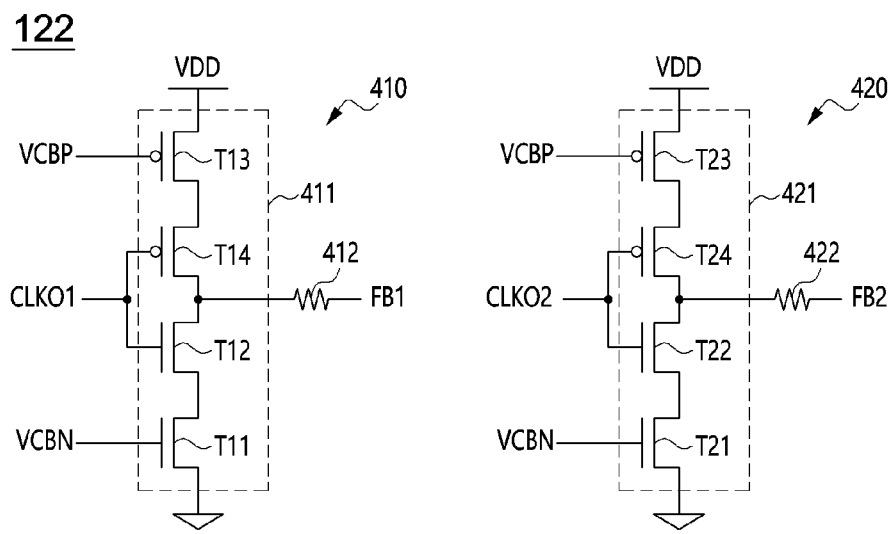
FIG. 4 is a block diagram illustrating a configuration of a compensating circuit illustrated in FIG. 1.

FIG. 4 is a block diagram illustrating a configuration of the compensating circuit 122 illustrated in FIG. 1. Referring to FIG. 4, the compensating circuit 122 may include a first compensating circuit 410 and a second compensating circuit 420. The first compensating circuit 410 may receive the first output clock signal CLKO1, the first control voltage VCBN, and the second control voltage VCBP to generate the first feedback signal FB1. The first feedback signal FB1 may be provided as the first input clock signal CLKI1. The first compensating circuit 410 may invert the first output clock signal CLKO1 to generate the first feedback signal FB1. The driving force with which the first compensating circuit 410 drives the first feedback signal FB1 may be adjusted according to the voltage levels of the first control voltage VCBN and the second control voltage VCBP. For example, the driving force of the first compensating circuit 410 may be increased as the voltage level of the first control voltage VCBN is raised and the voltage level of the second control voltage VCBP is lowered. For example, the driving force of the first compensating circuit 410 may be lessened as the voltage level of the first control voltage VCBN is lowered and the voltage level of the second control voltage VCBP is raised. As the driving force of the first compensating circuit 410 is increased, the first compensating circuit 410 may increase the amplitude of the first feedback signal FB1 to increase the variance of the voltage level of the first input clock signal CLKI1. As the driving force of the first compensating circuit 410 is lessened, the first compensating circuit 410 may decrease the amplitude of the first feedback signal FB1 to decrease the variance of the voltage level of the first input clock signal CLKI1.

The second compensating circuit 420 may receive the second output clock signal CLKO2, the first control voltage VCBN, and the second control voltage VCBP to generate the second feedback signal FB2. The second feedback signal FB2 may be provided as the second input clock signal CLKI2. The second compensating circuit 420 may invert the second output clock signal CLKO2 to generate the second feedback signal FB2. The driving force with which the second compensating circuit 420 drives the second feedback signal FB2 may be adjusted according to the voltage levels of the first control voltage VCBN and the second control voltage VCBP. For example, the driving force of the second compensating circuit 420 may be increased as the voltage level of the first control voltage VCBN is raised and the voltage level of the second control voltage VCBP is lowered. For example, the driving force of the second compensating circuit 420 may be lessened as the voltage level of the first control voltage VCBN is lowered and the voltage level of the second control voltage VCBP is raised. As the driving force of the second compensating circuit 420 is increased, the second compensating circuit 420 may increase the amplitude of the second feedback signal FB2 to increase the variance of the voltage level of the second input clock signal CLKI2. As the driving force of the second compensating circuit 420 is lessened, the second compensating circuit 420 may decrease the amplitude of the second feedback signal FB2 to decrease the variance of the voltage level of the second input clock signal CLKI2.

The first compensating circuit 410 may include a first inverter 411. The first inverter 411 may be a tri-state inverter. The first inverter 411 may include a first transistor T11, a second transistor T12, a third transistor T13 and a fourth transistor T14. Each of the first transistor T11 and the second transistor T12 may be a N-channel MOS transistor. Each of the third transistor T13 and the fourth transistor T14 may be a P-channel MOS transistor. A gate of the first transistor T11 may receive the first control voltage VCBN and a source of the first transistor T11 may be coupled to the ground voltage. A gate of the second transistor T12 may receive the first output clock signal CLKO1, a drain of the second transistor T12 may be coupled to a node, through which the first feedback signal FB1 is output, and a source of the second transistor T12 may be coupled to a drain of the first transistor T11. A gate of the third transistor T13 may receive the second control voltage VCBP and a source of the third transistor T13 may receive the power voltage VDD. A gate of the fourth transistor T14 may receive the first output clock signal CLKO1, a source of the fourth transistor T14 may be coupled to a drain of the third transistor T13, and a drain of the fourth transistor T14 may be coupled to the node, through which the first feedback signal FB1 is output. The first compensating circuit 410 may further include a resistor element 412. One end of the resistor element 412 may be coupled commonly to the drains of the second transistor T12 and the fourth transistor T14 and the first feedback signal FB1 may be output through the other end of the resistor element 412.

The second compensating circuit 420 may include a second inverter 421. The second inverter 421 may be a tri-state inverter. The second inverter 421 may include a first transistor T21, a second transistor T22, a third transistor T23 and a fourth transistor T24. Each of the first transistor T21 and the second transistor T22 may be a N-channel MOS transistor. Each of the third transistor T23 and the fourth transistor T24 may be a P-channel MOS transistor. A gate of the first transistor T21 may receive the first control voltage VCBN and a source of the first transistor T21 may be coupled to the ground voltage. A gate of the second transistor T22 may receive the second output clock signal CLKO2, a drain of the second transistor T22 may be coupled to a node, through which the second feedback signal FB2 is output, and a source of the second transistor T22 may be coupled to a drain of the first transistor T21. A gate of the third transistor T23 may receive the second control voltage VCBP and a source of the third transistor T23 may receive the power voltage VDD. A gate of the fourth transistor T24 may receive the second output clock signal CLKO2, a source of the fourth transistor T24 may be coupled to a drain of the third transistor T23, and a source of the fourth transistor T24 may be coupled to the node, through which the second feedback signal FB2 is output. The second compensating circuit 420 may further include a resistor element 422. One end of the resistor element 422 may be coupled commonly to the drains of the second transistor T22 and the fourth transistor T24 and the second feedback signal FB2 may be output through at the other end of the resistor element 422.

Figure 5:
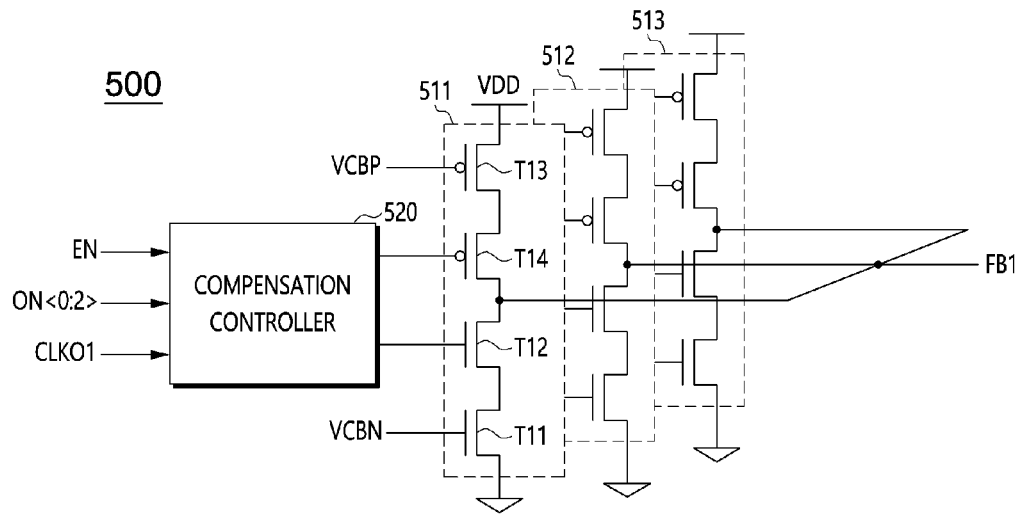
FIG. 5 is a diagram illustrating a configuration of a first compensating circuit in accordance with an embodiment.

FIG. 5 is a diagram illustrating a configuration of a first compensating circuit 500 in accordance with an embodiment. The first compensating circuit 410 illustrated in FIG. 4 may be replaced with the first compensating circuit 500. Although FIG. 5 illustrates the configuration of only the first compensating circuit 500, the second compensating circuit 420 may be replaced with the compensating circuit having the same configuration as the first compensating circuit 500 except the output clock signal and the feedback signal.

Referring to FIG. 5, the first compensating circuit 500 may include a plurality of inverters 511, 512 and 513. The plurality of inverters 511, 512 and 513 may commonly receive the first output clock signal CLKO1 to commonly generate the first feedback signal FB1. Each of the plurality of inverters 511, 512 and 513 may invert the first output clock signal CLKO1 to generate the first feedback signal FB1. The driving force with which each of the plurality of inverters 511, 512 and 513 drives the first feedback signal FB1 may be adjusted according to the first control voltage VCBN and the second control voltage VCBP. Each of the plurality of inverters 511, 512 and 513 may be a tri-state inverter. FIG. 5 illustrates the first compensating circuit 500 including three (3) number of inverters, which will not limit the scope of the present application. The first compensating circuit 500 may include various numbers of inverters.

The first compensating circuit 500 may further include a compensation controller 520. The compensation controller 520 may receive an enable signal EN and a turn-on signal ON<0:2>. Based on the enable signal EN and the turn-on signal ON<0:2>, the first compensating circuit 500 may determine a number of inverters to be activated among the plurality of inverters 511, 512 and 513. The first compensating circuit 500 may be activated according to the enable signal EN. When the enable signal EN is enabled, the plurality of inverters 511, 512 and 513 may be selectively activated according to the turn-on signal ON<0:2>. When the enable signal EN is disabled, all the plurality of inverters 511, 512 and 513 may be deactivated. The turn-on signal ON<0:2> may include a plurality of bits. A number of the bits within the turn-on signal ON<0:2> may be the same as the number of the plurality of inverters 511, 512 and 513. The bits within the turn-on signal ON<0:2> may be respectively corresponding to the plurality of inverters 511, 512 and 513 according to the one-on-one basis. Referring to FIG. 5, the turn-on signal ON<0:2> may include three (3) bits. The first bit ON<0> of the turn-on signal ON<0:2> may be allocated to the first inverter 511. The second bit ON<1> of the turn-on signal ON<0:2> may be allocated to the second inverter 512. The third bit ON<2> of the turn-on signal ON<0:2> may be allocated to the third inverter 513. For example, when all the first to third bits ON<0:2> of the turn-on signal ON<0:2> have a high logic level, the compensation controller 520 may provide the first to third inverters 511, 512 and 513 with the first output clock signal CLKO1. When one of the first to third bits ON<0:2> of the turn-on signal ON<0:2> has a low logic level, the compensation controller 520 might not provide the first output clock signal CLKO1 to a corresponding one of the plurality of inverters 511, 512 and 513 to deactivate the corresponding inverter. For example, when the second bit ON<1> has a low logic level and each of the first bit ON<0> and the third bit ON<2> has a high logic level within the turn-on signal ON<0:2>, the second inverter 512 may be deactivated and each of the first inverter 511 and the third inverter 513 may be activated to generate the first feedback signal FB1 from the first output clock signal CLKO1.

Figure 6:
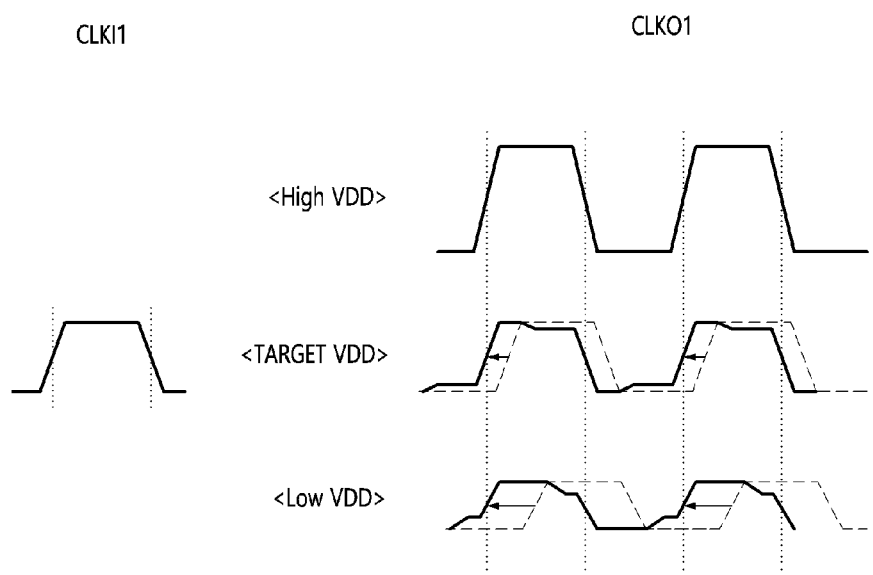
FIG. 6 is a timing diagram illustrating an operation of a clock generating circuit in accordance with an embodiment.

FIG. 6 is a timing diagram illustrating an operation of the clock generating circuit 100 in accordance with an embodiment. Hereinafter, described with reference to FIGS. 1 and 6 will be the operation of the clock generating circuit 100 in accordance with an embodiment. When the voltage level of the power voltage VDD rises be higher than the target voltage level ("High VDD"), the amplitude of the first output clock signal CLKO1 may be greater than the first input clock signal CLKI1, the transition gradient of the first output clock signal CLKO1 may be greater than the first input clock signal CLKI1 and the phase of the first output clock signal CLKO1 might not substantially change with reference to the first input clock signal CLKI1, as illustrated with a solid line. When the voltage control circuit 121 detects the rise of the voltage level of the power voltage VDD, the voltage control circuit 121 may lower the voltage level of the first control voltage VCBN and may raise the voltage level of the second control voltage VCBP. The driving force of the compensating circuit 122 may decrease according to the first control voltage VCBN and the second control voltage VCBP. The compensating circuit 122 may perform, with a lesser strength than the reference strength, the emphasis operation on the first input clock signal CLKI1.

When the first input clock signal CLKI1 has a low logic level, the compensating circuit 122 may generate the first feedback signal FB1 having a high logic level and may provide the first feedback signal FB1 to the first input clock signal CLKI1 to raise the voltage level of the first input clock signal CLKI1 by a lesser voltage level than a reference voltage level. On the contrary, when the first input clock signal CLKI1 has a high logic level, the compensating circuit 122 may generate the first feedback signal FB1 having a low logic level and may provide the first feedback signal FB1 to the first input clock signal CLKI1 to lower the voltage level of the first input clock signal CLKI1 by a lesser voltage level than the reference voltage level. Therefore, in an embodiment, the compensating circuit 122 might not substantially change the phase of the first output clock signal CLKO1.

When the voltage level of the power voltage VDD maintains the target voltage level ("Target VDD"), the amplitude of the first output clock signal CLKO1 may be substantially the same as the first input clock signal CLKI1, the transition gradient of the first output clock signal CLKO1 may be less than the first input clock signal CLKI1 and the phase of the first output clock signal CLKO1 may be delayed with reference to the first input clock signal CLKI1, as illustrated with a dotted line. The voltage control circuit 121 may detect the power voltage VDD to have the target voltage level. Each of the first control voltage VCBN and the second control voltage VCBP may have a default voltage level. The driving force of the compensating circuit 122 may be a default driving force according to the first control voltage VCBN and the second control voltage VCBP. The compensating circuit 122 may perform, with the reference strength, the emphasis operation on the first input clock signal CLKI1. When the first input clock signal CLKI1 has a low logic level, the compensating circuit 122 may generate the first feedback signal FB1 having a high logic level and may provide the first feedback signal FB1 to the first input clock signal CLKI1 to raise the voltage level of the first input clock signal CLKI1 by the reference voltage level. On the contrary, when the first input clock signal CLKI1 has a high logic level, the compensating circuit 122 may generate the first feedback signal FB1 having a low logic level and may provide the first feedback signal FB1 to the first input clock signal CLKI1 to lower the voltage level of the first input clock signal CLKI1 by the reference voltage level. Therefore, the compensating circuit 122 may advance the phase of the first output clock signal CLKO1, as illustrated with the solid line. The first output clock signal CLKO1 may have substantially the same phase as the first output clock signal CLKO1 when the voltage level of the power voltage VDD is higher than the target voltage level ("High VDD").

When the voltage level of the power voltage VDD decreases to be lower than the target voltage level ("Low VDD"), the amplitude of the first output clock signal CLKO1 may be less, the transition gradient of the first output clock signal CLKO1 may be less and the phase of the first output clock signal CLKO1 may be delayed more with reference to the first output clock signal CLKO1 when the power voltage VDD has the target voltage level ("Target VDD"), as illustrated with a dotted line. When the voltage control circuit 121 detects the fall of the voltage level of the power voltage VDD, the voltage control circuit 121 may raise the voltage level of the first control voltage VCBN and may lower the voltage level of the second control voltage VCBP. The driving force of the compensating circuit 122 may increase according to the first control voltage VCBN and the second control voltage VCBP. The compensating circuit 122 may perform, with a greater strength than the reference strength, the emphasis operation on the first input clock signal CLKI1. When the first input clock signal CLKI1 has a low logic level, the compensating circuit 122 may generate the first feedback signal FB1 having a high logic level and may provide the first feedback signal FB1 to the first input clock signal CLKI1 to raise the voltage level of the first input clock signal CLKI1 by a greater voltage level than the reference voltage level. On the contrary, when the first input clock signal CLKI1 has a high logic level, the compensating circuit 122 may generate the first feedback signal FB1 having a low logic level and may provide the first feedback signal FB1 to the first input clock signal CLKI1 to lower the voltage level of the first input clock signal CLKI1 by a greater voltage level than the reference voltage level. Therefore, the compensating circuit 122 may advance the phase of the first output clock signal CLKO1 by a greater amount, as illustrated with the solid line. The first output clock signal CLKO1 may have substantially the same phase as the first output clock signals CLKO1 when the voltage level of the power voltage VDD is higher than the target voltage level ("High VDD") and when the power voltage VDD has the target voltage level ("Target VDD").

Figure 7:
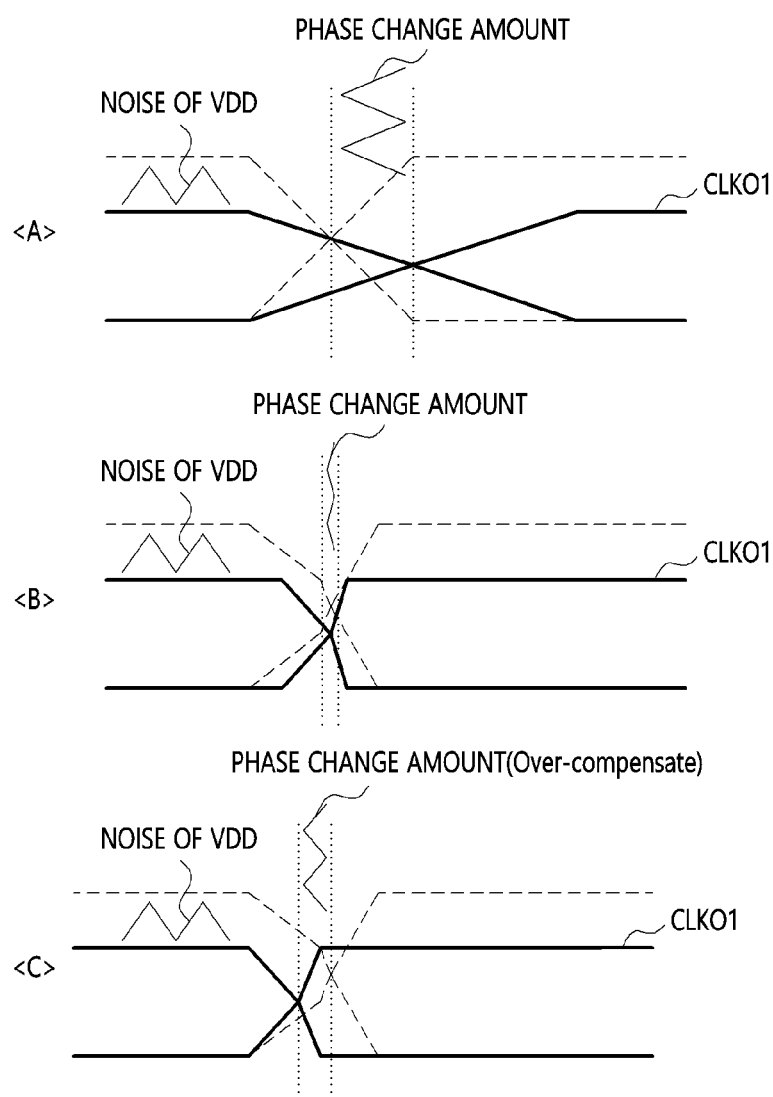
FIG. 7 is a timing diagram illustrating an operation of a clock generating circuit in accordance with an embodiment.

FIG. 7 is a timing diagram illustrating an operation of the clock generating circuit 100 in accordance with an embodiment. Hereinafter, described with reference to FIGS. 1, 3 and 7 will be the operation of the clock generating circuit 100 in accordance with an embodiment. FIG. 7 exemplarily illustrates the case that there occurs a noise in the power voltage VDD and therefore the voltage level of the power voltage VDD repeatedly falls and then rises to be lower and then higher than the target voltage level. Referring to FIG. 7, the dotted lines represent the ideal wave form of the first output clock signal CLKO1 when there does not occur any noise in the power voltage VDD. "A" of FIG. 7 illustrates the waveforms when the phase compensating circuit 120 is not provided. The phase variance may increase due to the noise of the power voltage VDD. As illustrated with a solid line, the amplitude of the first output clock signal CLKO1 may be relatively less and the cross point, at which the logic level of the first output clock signal CLKO1 transitions, may be delayed, which causes the phase delay of the first output clock signal CLKO1. For example, the delay amount of the first output clock signal CLKO1 may decrease when the voltage level of the power voltage VDD rises to be higher than the target voltage level, and may increase when the voltage level of the power voltage VDD falls to be lower than the target voltage level.

When the clock generating circuit 100 is provided with the phase compensating circuit 120, the clock generating circuit 100 may advance the phase of the first output clock signal CLKO1 despite the noise of the power voltage VDD. In this case, the amount by which the phase compensating circuit 120 advances the phase of the first output clock signal CLKO1 may vary according to a ratio between the first resistor R1 and the second resistor R2 within the inverting amplifier 320 illustrated in FIG. 3. Each unit variance of the voltage levels of the first control voltage VCBN and the second control voltage VCBP may depend on the ratio between the first resistor R1 and the second resistor R2. As described with reference to FIG. 3, as the resistance value RR2 of the second resistor R2 becomes greater, the variance of the voltage level of the first control voltage VCBN, which corresponds to the voltage level change of the power voltage VDD, may become greater.

"B" of FIG. 7 illustrates the waveforms when the resistance value RR2 of the second resistor R2 is relatively less than the resistance value RR2 of the second resistor R2 in a case of "C" of FIG. 7. In the case that the resistance value RR2 of the second resistor R2 is relatively less than the resistance value RR2 of the second resistor R2 in a case of "C" of FIG. 7, the variance of the voltage level of the first control voltage VCBN due to the noise of the power voltage VDD may be relatively less. Even when there occurs a noise in the power voltage VDD, the phase compensating circuit 120 may decrease the phase variance of the first output clock signal CLKO1. The first output clock signal CLKO1 may be to have substantially the same phase as the ideal first output clock signal CLKO1.

"C" of FIG. 7 illustrates the waveforms when the resistance value RR2 of the second resistor R2 is relatively greater than the resistance value RR2 of the second resistor R2 in the case of "B" of FIG. 7. In the case that the resistance value RR2 of the second resistor R2 is relatively greater than the resistance value RR2 of the second resistor R2 in the case of "B" of FIG. 7, the variance of the voltage level of the first control voltage VCBN due to the noise of the power voltage VDD may be relatively greater. In this case, the phase compensating circuit 120 may over-compensate the phase of the first output clock signal CLKO1. The first output clock signal CLKO1 may be to have a phase even leading to the phase of the ideal first output clock signal CLKO1. Therefore, the ratio between the first resistor R1 and the second resistor R2 may be adjusted to variously control, if needed, the amount of the compensation that the phase compensating circuit 120 performs.

Figure 8:
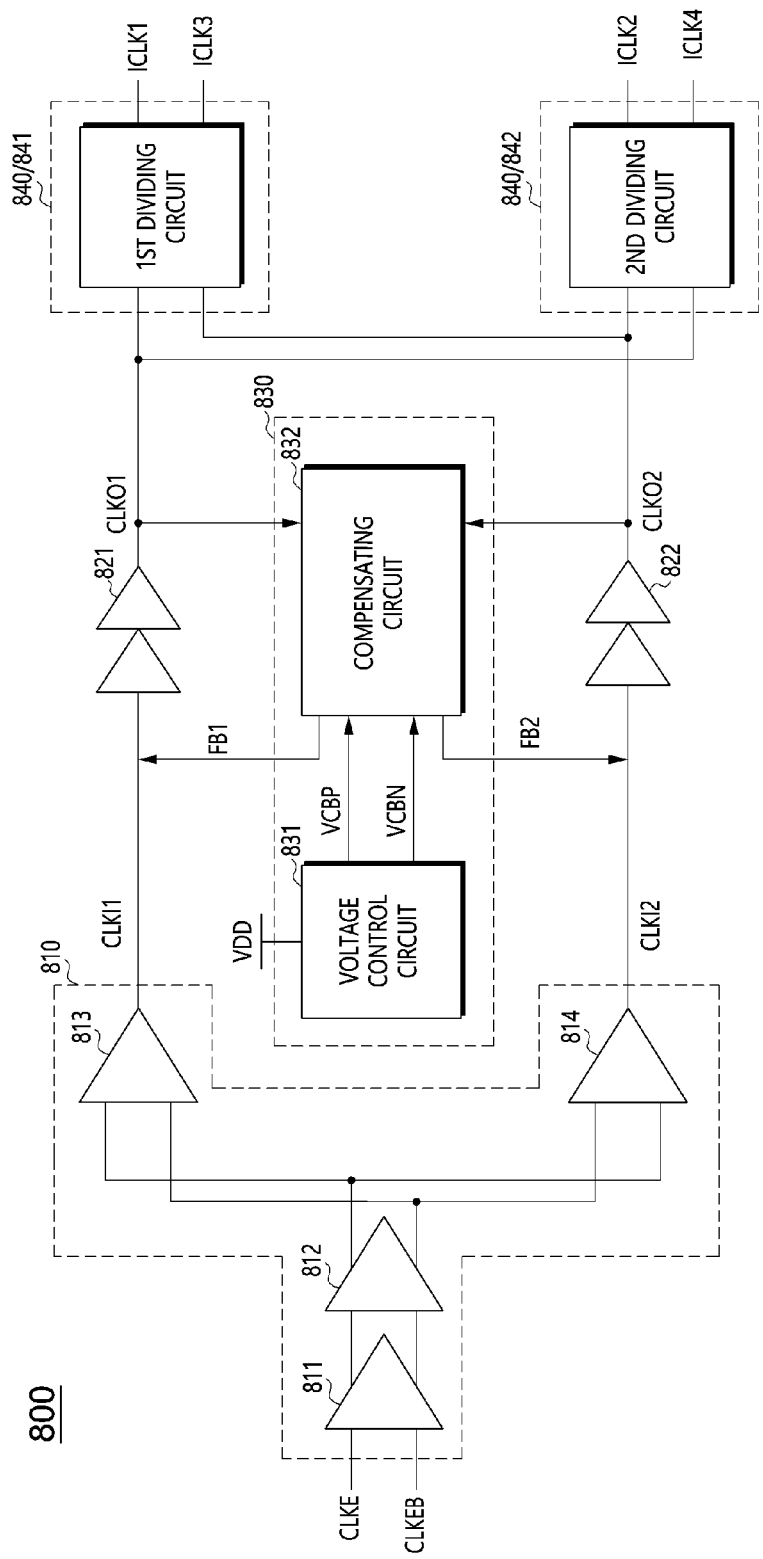
FIG. 8 is a diagram illustrating a configuration of a clock distribution network in accordance with an embodiment.

FIG. 8 is a diagram illustrating a configuration of a clock distribution network 800 in accordance with an embodiment. Referring to FIG. 8, the clock distribution network 800 may include a clock receiving circuit 810, a first buffer circuit 821, a second buffer circuit 822, a phase compensating circuit 830 and a clock dividing circuit 840. The clock receiving circuit 810 may receive an external clock signal CLKE and a complementary external clock signal CLKEB. Based on the external clock signal CLKE and the complementary external clock signal CLKEB, the clock receiving circuit 810 may generate a first input clock signal CLKI1 and a second input clock signal CLKI2. The complementary external clock signal CLKEB may have an opposite phase to the external clock signal CLKE. The clock receiving circuit 810 may differentially amplify the external clock signal CLKE and the complementary external clock signal CLKEB to generate the first input clock signal CLKI1 and the second input clock signal CLKI2. The first input clock signal CLKI1 may have a phase corresponding to the external clock signal CLKE and the second input clock signal CLKI2 may have a phase corresponding to the complementary external clock signal CLKEB. The clock receiving circuit 810 may include a first amplifier 811, a second amplifier 812, a third amplifier 813 and a fourth amplifier 814. The first amplifier 811 may differentially amplify the external clock signal CLKE and the complementary external clock signal CLKEB. The second amplifier 812 may differentially amplify signals output from the first amplifier 811. The third amplifier 813 may differentially amplify signals output from the second amplifier 812 to generate the first input clock signal CLKI1. The fourth amplifier 814 may differentially amplify the signals output from the second amplifier 812 to generate the second input clock signal CLKI2. For example, the third amplifier 813 may receive, through its positive input node, the external clock signal CLKE that is differentially amplified by the first amplifier 811 and the second amplifier 812 and may receive, through its negative input node, the complementary external clock signal CLKEB that is differentially amplified by the first amplifier 811 and the second amplifier 812. The fourth amplifier 814 may receive, through its positive input node, the complementary external clock signal CLKEB that is differentially amplified by the first amplifier 811 and the second amplifier 812 and may receive, through its negative input node, the external clock signal CLKE that is differentially amplified by the first amplifier 811 and the second amplifier 812.

The first buffer circuit 821 may buffer the first input clock signal CLKI1 to generate a first output clock signal CLKO1. The second buffer circuit 822 may buffer the second input clock signal CLKI2 to generate a second output clock signal CLKO2. The phase compensating circuit 830 may detect the voltage level change of the power voltage VDD and may adjust, according to the voltage level change of the power voltage VDD, the phases of the first input clock signal CLKI1 and the second input clock signal CLKI2 to change the phases of the first output clock signal CLKO1 and the second output clock signal CLKO2. The first buffer circuit 821, the second buffer circuit 822 and the phase compensating circuit 830 may be the same respectively as the first buffer circuit 821, the second buffer circuit 822, and the phase compensating circuit 830 illustrated in FIG. 1. Omitted will be redundant description on the same element.

The clock dividing circuit 840 may receive the first output clock signal CLKO1 from the first buffer circuit 821 and may receive the second output clock signal CLKO2 from the second buffer circuit 822. The clock dividing circuit 840 may divide frequencies of the first output clock signal CLKO1 and the second output clock signal CLKO2 to generate a first internal clock signal ICLK1, a second internal clock signal ICLK2, a third internal clock signal ICLK3 and a fourth internal clock signal ICLK4. The first to fourth internal clock signals ICLK1, ICLK2, ICLK3 and ICLK4 may sequentially have a phase difference of 90° between each other. The clock dividing circuit 840 may include a first dividing circuit 841 and a second dividing circuit 842. The first dividing circuit 841 may utilize the first output clock signal CLKO1 as a reference clock signal and may divide the frequencies of the first output clock signal CLKO1 and the second output clock signal CLKO2 to generate the first internal clock signal ICLK1 and the third internal clock signal ICLK3. The first internal clock signal ICLK1 and the third internal clock signal ICLK3 may be clock signals synchronized to a rising edge of the first output clock signal CLKO1. The second dividing circuit 842 may utilize the second output clock signal CLKO2 as a reference clock signal and may divide the frequencies of the first output clock signal CLKO1 and the second output clock signal CLKO2 to generate the second internal clock signal ICLK2 and the fourth internal clock signal ICLK4. The second internal clock signal ICLK2 and the fourth internal clock signal ICLK4 may be clock signals synchronized to a rising edge of the second output clock signal CLKO2. The clock distribution network 800 may provide the first to fourth internal clock signals ICLK1, ICLK2, ICLK3 and ICLK4 to various internal circuits that operate in synchronization with a clock signal. Even when there occurs a noise in the power voltage VDD, in an embodiment, the phase compensating circuit 830 may adjust the phases of the first output clock signal CLKO1 and the second output clock signal CLKO2, which are provided to the clock dividing circuit 840, to keep stable phases of the first to fourth internal clock signals ICLK1, ICLK2, ICLK3 and ICLK4 thereby improving the operational reliability of the internal circuits.

Figure 9:
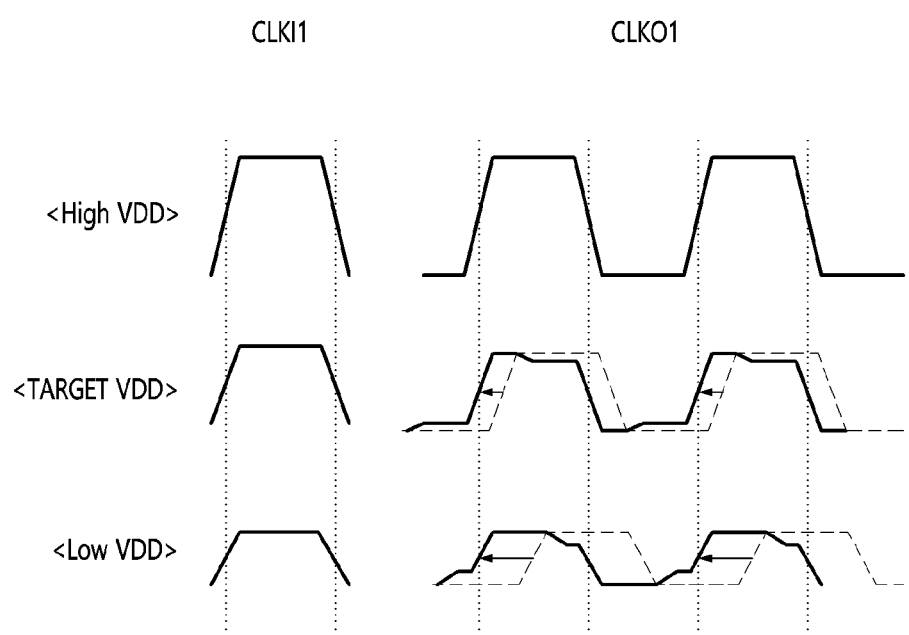
FIG. 9 is a timing diagram illustrating an operation of a clock distribution network in accordance with an embodiment.

FIG. 9 is a timing diagram illustrating an operation of the clock distribution network 800 illustrated in FIG. 8. Hereinafter, described with reference to FIGS. 8 and 9 will be the operation of the clock distribution network 800 in accordance with an embodiment. When there occurs a noise in the power voltage VDD and thus the voltage level of the power voltage VDD rises to be higher than the target voltage level ("High VDD"), the amplitudes of the first input clock signal CLKI1 and the first output clock signal CLKO1 may increase, the transition gradients of the first input clock signal CLKI1 and the first output clock signal CLKO1 may increase and the phase of the first output clock signal CLKO1 might not substantially change with reference to the first input clock signal CLKI1, as illustrated with a solid line. When the voltage control circuit 831 detects the rise of the voltage level of the power voltage VDD, the voltage control circuit 831 may lower the voltage level of the first control voltage VCBN and may raise the voltage level of the second control voltage VCBP. The driving force of the compensating circuit 832 may decrease according to the first control voltage VCBN and the second control voltage VCBP. The compensating circuit 832 may perform, with a lesser strength than the reference strength, the emphasis operation on the first input clock signal CLKI1. When the first input clock signal CLKI1 has a low logic level, the compensating circuit 832 may provide the first feedback signal FB1 as the first input clock signal CLKI1 to raise the voltage level of the first input clock signal CLKI1 by a lesser voltage level than a reference voltage level. On the contrary, when the first input clock signal CLKI1 has a high logic level, the compensating circuit 832 may provide the first feedback signal FB1 as the first input clock signal CLKI1 to lower the voltage level of the first input clock signal CLKI1 by a lesser voltage level than the reference voltage level. Therefore, the compensating circuit 832 might not substantially change the phase of the first output clock signal CLKO1.

When the voltage level of the power voltage VDD maintains the target voltage level ("Target VDD"), the amplitude of the first input clock signal CLKI1 may maintain a default value. Although the first output clock signal CLKO1 may have substantially the same amplitude as the first input clock signal CLKI1, the transition gradient of the first output clock signal CLKO1 may be slightly less than the first input clock signal CLKI1 and the phase of the first output clock signal CLKO1 may be delayed with reference to the first input clock signal CLKI1, as illustrated with a dotted line. The voltage control circuit 831 may detect the power voltage VDD to have the target voltage level. Each of the first control voltage VCBN and the second control voltage VCBP may have a default voltage level. The driving force of the compensating circuit 832 may be a default driving force according to the first control voltage VCBN and the second control voltage VCBP. The compensating circuit 832 may perform, with the reference strength, the emphasis operation on the first input clock signal CLKI1. When the first input clock signal CLKI1 has a low logic level, the compensating circuit 832 may provide the first feedback signal FB1 as the first input clock signal CLKI1 to raise the voltage level of the first input clock signal CLKI1 by the reference voltage level. On the contrary, when the first input clock signal CLKI1 has a high logic level, the compensating circuit 832 may provide the first feedback signal FB1 as the first input clock signal CLKI1 to lower the voltage level of the first input clock signal CLKI1 by the reference voltage level. Therefore, the compensating circuit 832 may advance the phase of the first output clock signal CLKO1, as illustrated with the solid line. The first output clock signal CLKO1 may have substantially the same phase as the first output clock signal CLKO1 when the voltage level of the power voltage VDD is higher than the target voltage level ("High VDD").

When the voltage level of the power voltage VDD falls to be lower than the target voltage level ("Low VDD"), the amplitude of the first input clock signal CLKI1 may decrease. The amplitude of the first output clock signal CLKO1 may be less, the transition gradient of the first output clock signal CLKO1 may be less and the phase of the first output clock signal CLKO1 may be delayed more with reference to the first output clock signal CLKO1 when the power voltage VDD has the target voltage level ("Target VDD"), as illustrated with a dotted line. When the voltage control circuit 831 detects the fall of the voltage level of the power voltage VDD, the voltage control circuit 831 may raise the voltage level of the first control voltage VCBN and may lower the voltage level of the second control voltage VCBP. The driving force of the compensating circuit 832 may increase according to the first control voltage VCBN and the second control voltage VCBP. The compensating circuit 832 may perform, with a greater strength than the reference strength, the emphasis operation on the first input clock signal CLKI1. When the first input clock signal CLKI1 has a low logic level, the compensating circuit 832 may provide the first feedback signal FB1 as the first input clock signal CLKI1 to raise the voltage level of the first input clock signal CLKI1 by a greater voltage level than the reference voltage level. On the contrary, when the first input clock signal CLKI1 has a high logic level, the compensating circuit 832 may provide the first feedback signal FB1 as the first input clock signal CLKI1 to lower the voltage level of the first input clock signal CLKI1 by a greater voltage level than the reference voltage level. Therefore, in an embodiment, the compensating circuit 832 may advance the phase of the first output clock signal CLKO1 by a greater amount, as illustrated with the solid line. The first output clock signal CLKO1 may have substantially the same phase as the first output clock signal CLKO1 when the voltage level of the power voltage VDD is higher than the target voltage level ("High VDD") and when the power voltage VDD has the target voltage level ("Target VDD").

Figure 10:
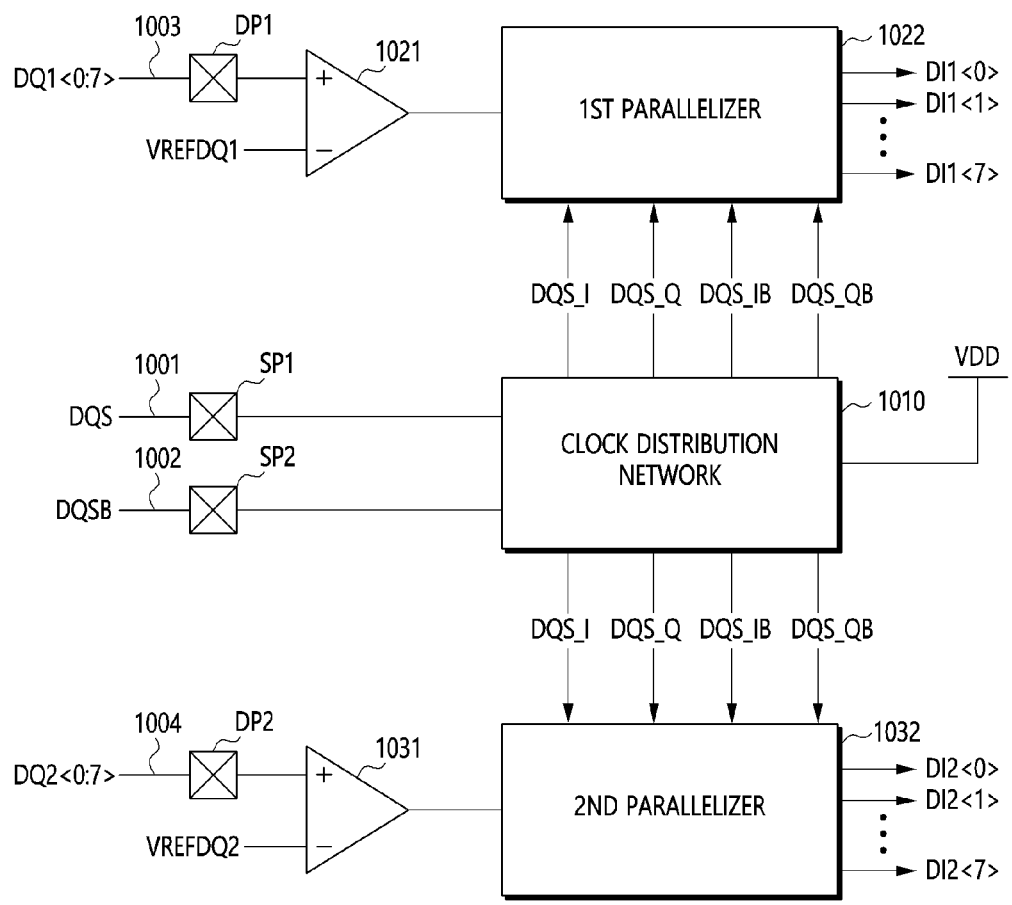
FIG. 10 is a diagram illustrating a configuration of a semiconductor apparatus in accordance with an embodiment.

FIG. 10 is a diagram illustrating a configuration of a semiconductor apparatus 1000 in accordance with an embodiment. Referring to FIG. 10, the semiconductor apparatus 1000 may include a clock distribution network 1010, a first data receiving circuit 1021 and a first parallelizer 1022. The clock distribution network 1010 may receive, through a first strobe pad SP1 coupled to a first strobe bus 1001, a data strobe signal DQS from an external apparatus. The clock distribution network 1010 may receive, through a second strobe pad SP2 coupled to a second strobe bus 1002, a complementary data strobe signal DQSB from the external apparatus. The data strobe signal DQS and the complementary data strobe signal DQSB may be a differential signal pair. The clock distribution network 1010 may buffer the data strobe signal DQS and the complementary data strobe signal DQSB and may adjust, according to the voltage level change of the power voltage VDD, the phases of the data strobe signal DQS and the complementary data strobe signal DQSB. The clock distribution network 1010 may divide the frequencies of the data strobe signal DQS and the complementary data strobe signal DQSB to generate at least a first internal strobe signal DQS_I, a second internal strobe signal DQS_Q, a third internal strobe signal DQS_IB and a fourth internal strobe signal DQS_QB. The first to fourth internal strobe signals DQS_I, DQS_Q, DQS_IB and DQS_QB may sequentially have a phase difference of 90° between each other. The clock distribution network 1010 may provide a plurality of data path circuits with the first to fourth internal strobe signals DQS_I, DQS_Q, DQS_IB and DQS_QB. The first data receiving circuit 1021 and the first parallelizer 1022 may form one of the plurality of data path circuits. The clock distribution network 800 illustrated in FIG. 8 may be applied as the clock distribution network 1010. The data strobe signal DQS and the complementary data strobe signal DQSB may correspond to the external clock signal CLKE and the complementary external clock signal CLKEB, respectively. The first to fourth internal strobe signals DQS_I, DQS_Q, DQS_IB and DQS_QB may correspond to the first to fourth internal clock signals ICLK1, ICLK2, ICLK3 and ICLK4, respectively.

The first data receiving circuit 1021 may be coupled to a first data pad DP1 that is coupled to a first data bus 1003. The first data receiving circuit 1021 may receive, through the first data pad DP1, first data DQ1<0:7> transferred through the first data bus 1003. The first data DQ1<0:7> may include a plurality of serial data signal. Although FIG. 10 exemplifies the first data DQ1<0:7> including 8-bit serial data signals, the number of serial data signals included in the first data DQ1<0:7> may variously change. The first data receiving circuit 1021 may receive a first data reference voltage VREFDQ1. The first data receiving circuit 1021 may compare the first data DQ1<0:7> and the first data reference voltage VREFDQ1 with each other to determine a logic level of the first data DQ1<0:7>. The first data reference voltage VREFDQ1 may have a voltage level corresponding to an intermediate voltage level between voltage levels respectively corresponding to high and low logic levels of the first data DQ1<0:7>.

The first parallelizer 1022 may be coupled to the first data receiving circuit 1021 and may receive the first data DQ1<0:7> through the first data receiving circuit 1021. The first parallelizer 1022 may receive the first to fourth internal strobe signals DQS_I, DQS_Q, DQS_IB and DQS_QB from the clock distribution network 1010. The first parallelizer 1022 may synchronize the first data DQ1<0:7> to the first to fourth internal strobe signals DQS_I, DQS_Q, DQS_IB and DQS_QB to generate a plurality of first internal data signals. The plurality of first internal data signals may include first to eighth internal data signals DI1<0>, DI1<1>, . . . and DI<7>. The first parallelizer 1022 may sequentially sample the first data DQ1<0:7> with the first to fourth internal strobe signals DQS_I, DQS_Q, DQS_IB and DQS_QB to generate the first to eighth internal data signals DI1<0>, DI1<1>, . . . and DI<7>. For example, the first parallelizer 1022 may sample the first data DQ1<0:7> in synchronization to a rising edge of the first internal strobe signal DQS_I to generate the first internal data signal DI1<0>. The first parallelizer 1022 may sample the first data DQ1<0:7> in synchronization to a rising edge of the second internal strobe signal DQS_Q to generate the second internal data signal DI1<1>. The first parallelizer 1022 may sample the first data DQ1<0:7> in synchronization to a rising edge of the third internal strobe signal DQS_IB to generate the third internal data signal DI1<2>. The first parallelizer 1022 may sample the first data DQ1<0:7> in synchronization to a rising edge of the fourth internal strobe signal DQS_QB to generate the fourth internal data signal DI1<3>. The first parallelizer 1022 may sample the first data DQ1<0:7> in synchronization to a subsequent rising edge of the first internal strobe signal DQS_I to generate the fifth internal data signal DI1<4>. The first parallelizer 1022 may sample the first data DQ1<0:7> in synchronization to a subsequent rising edge of the second internal strobe signal DQS_Q to generate the sixth internal data signal DI1<5>. The first parallelizer 1022 may sample the first data DQ1<0:7> in synchronization to a subsequent rising edge of the third internal strobe signal DQS_IB to generate the seventh internal data signal DI1<6>. The first parallelizer 1022 may sample the first data DQ1<0:7> in synchronization to a subsequent rising edge of the fourth internal strobe signal DQS_QB to generate the eighth internal data signal DI1<7>. The first to eighth internal data signals DI1<0>, DI1<1>, . . . and DI<7> may be output as parallel data.

The semiconductor apparatus 1000 may include the other data path circuit and the other data path circuit may include a second data receiving circuit 1031 and a second parallelizer 1032. The second data receiving circuit 1031 may be coupled to a second data pad DP2 that is coupled to a second data bus 1004. The second data receiving circuit 1031 may receive, through the second data pad DP2, second data DQ2<0:7> transferred through the second data bus 1004. The second data DQ2<0:7> may include a plurality of serial data signal. The second data receiving circuit 1031 may receive a second data reference voltage VREFDQ2. The second data receiving circuit 1031 may compare the second data DQ2<0:7> and the second data reference voltage VREFDQ2 with each other to determine a logic level of the second data DQ2<0:7>. The second data reference voltage VREFDQ2 may have a voltage level corresponding to an intermediate voltage level between voltage levels respectively corresponding to high and low logic levels of the second data DQ2<0:7>. The second data reference voltage VREFDQ2 may have the same voltage level as or a different voltage level from the first data reference voltage VREFDQ1. The voltage levels of the first data reference voltage VREFDQ1 and the second data reference voltage VREFDQ2 may variously change through a training operation performed by the semiconductor apparatus 1000 together with the external apparatus.

The second parallelizer 1032 may be coupled to the second data receiving circuit 1031 and may receive the second data DQ2<0:7> through the second data receiving circuit 1031. The second parallelizer 1032 may receive the first to fourth internal strobe signals DQS_I, DQS_Q, DQS_IB and DQS_QB from the clock distribution network 1010. The second parallelizer 1032 may synchronize the second data DQ2<0:7> to the first to fourth internal strobe signals DQS_I, DQS_Q, DQS_IB and DQS_QB to generate a plurality of second internal data signals. The plurality of second internal data signals may include first to eighth internal data signals DI2<0>, DI2<1>, . . . and DI<7>. The second parallelizer 1032 may sequentially sample the second data DQ2<0:7> with the first to fourth internal strobe signals DQS_I, DQS_Q, DQS_IB and DQS_QB to generate the first to eighth internal data signals DI2<0>, DI2<1>, . . . and DI<7>. For example, the second parallelizer 1032 may sample the second data DQ2<0:7> in synchronization to a rising edge of the first internal strobe signal DQS_I to generate the first internal data signal DI2<0>. The second parallelizer 1032 may sample the second data DQ2<0:7> in synchronization to a rising edge of the second internal strobe signal DQS_Q to generate the second internal data signal DI2<1>. The second parallelizer 1032 may sample the second data DQ2<0:7> in synchronization to a rising edge of the third internal strobe signal DQS_IB to generate the third internal data signal DI2<2>. The second parallelizer 1032 may sample the second data DQ2<0:7> in synchronization to a rising edge of the fourth internal strobe signal DQS_QB to generate the fourth internal data signal DI2<3>. The second parallelizer 1032 may sample the second data DQ2<0:7> in synchronization to a subsequent rising edge of the first internal strobe signal DQS_I to generate the fifth internal data signal DI2<4>. The second parallelizer 1032 may sample the second data DQ2<0:7> in synchronization to a subsequent rising edge of the second internal strobe signal DQS_Q to generate the sixth internal data signal DI2<5>. The second parallelizer 1032 may sample the second data DQ2<0:7> in synchronization to a subsequent rising edge of the third internal strobe signal DQS_IB to generate the seventh internal data signal DI2<6>. The second parallelizer 1032 may sample the second data DQ2<0:7> in synchronization to a subsequent rising edge of the fourth internal strobe signal DQS_QB to generate the eighth internal data signal DI2<7>. The first to eighth internal data signals DI2<0>, DI2<1>, . . . and DI<7> may be output as parallel data. Even when there occurs a noise in the power voltage VDD and thus the voltage level of the power voltage VDD changes, in an embodiment, the clock distribution network 1010 may generate the first to fourth internal strobe signals DQS_I, DQS_Q, DQS_IB and DQS_QB having steady phases and may improve the setup and hold margin where the first parallelizer 1022 and the second parallelizer 1032 respectively sample the first data DQ1<0:7> and the second data DQ2<0:7>. Therefore, in an embodiment, the semiconductor apparatus 1000 may stably perform a high-speed operation and operational reliability of the semiconductor apparatus 1000 may be improved.

While certain embodiments have been described above, it will be understood to those skilled in the art that the embodiments described are by way of example only. Accordingly, the clock generating circuit, the clock distribution network and the semiconductor apparatus including the clock generating circuit should not be limited based on the described embodiments. Rather, the clock generating circuit, the clock distribution network and the semiconductor apparatus including the clock generating circuit described herein should only be limited in light of the claims that follow when taken in conjunction with the above description and accompanying drawings.

What is claimed is:

1. A clock generating circuit comprising:
    a buffer circuit configured to non-invert an input clock signal to generate an output clock signal;
    a voltage control circuit configured to detect a voltage level change of a power voltage and configured to generate a first control voltage and a second control voltage, the first control voltage and the second control voltage having varying voltage levels according to the detected voltage level change; and
    a compensating circuit configured to invert the output clock signal according to the first and second control voltages to generate a feedback signal using a single inversion stage, and configured to provide the feedback signal to the input clock signal,
    wherein the feedback signal is a single inversion of the output clock signal.

2. The clock generating circuit of claim 1, wherein the voltage control circuit is configured to generate the first control voltage having the voltage level, which complementarily changes with reference to a voltage level of the power voltage, and configured to generate the second control voltage having the voltage level, which complementarily changes with reference to the first control voltage.

3. The clock generating circuit of claim 1, wherein the voltage control circuit includes:
    a bias generating circuit configured to generate a first bias voltage having a constant voltage level regardless of the voltage level change of the power voltage and configured to generate a second bias voltage having a varying voltage level according to the voltage level change of the power voltage; and a control voltage generating circuit configured to generate the first control voltage and the second control voltage having the voltage levels varying in proportion to voltage level difference between the first bias voltage and the second bias voltage.

4. The clock generating circuit of claim 3, wherein the control voltage generating circuit includes:

an amplifier including a positive input node receiving the second bias voltage and a negative input node receiving an output voltage, the amplifier configured to generate the output voltage;

an inverting amplifier including a positive input node receiving the first bias voltage and a negative input node receiving the output voltage, the inverting amplifier configured to generate the first control voltage; and a voltage driver configured to generate the second control voltage having the voltage level, which complementarily changes with reference to a voltage level change of the first control voltage.

5. The clock generating circuit of claim 1, wherein the compensating circuit is configured to change a voltage level of the input clock signal by a greater amount as the voltage level of the first control voltage is raised and the voltage level of the second control voltage is lowered, and wherein the compensating circuit is configured to change the voltage level of the input clock signal by a lesser amount as the voltage level of the first control voltage is lowered and the voltage level of the second control voltage is raised.

6. The clock generating circuit of claim 1, wherein the compensating circuit includes an inverter configured to invert the output clock signal to generate the feedback signal and configured to provide the feedback signal to the input clock signal, wherein a driving force with which the inverter drives the feedback signal is adjusted on a basis of the first control voltage and the second control voltage.

7. The clock generating circuit of claim 1, wherein the compensating circuit includes:

a plurality of inverters configured to invert the output control signal to generate the feedback signal, a driving force with which the plurality of inverters drives the feedback signal being adjusted on a basis of the first control voltage and the second control voltage; and a compensation controller configured to determine, based on an enable signal and a turn-on signal, a number of inverters to be activated among the plurality of inverters.

8. A clock generating circuit comprising:

a first buffer circuit configured to non-invert a first input clock signal to generate a first output clock signal;

a second buffer circuit configured to non-invert a second input clock signal to generate a second output clock signal, the second input clock signal being a complementary clock signal of the first input clock signal;

a voltage control circuit configured to detect a voltage level change of a power voltage and configured to generate a first control voltage and a second control voltage, the first control voltage and the second control voltage having varying voltage levels according to the detected voltage level change;

a first compensating circuit configured to invert the first output clock signal according to the first and second control voltages to generate a first feedback signal using a single inversion stage, and configured to provide the first feedback signal to the first input clock signal; and a second compensating circuit configured to invert the second output clock signal according to the first and second control voltages to generate a second feedback signal, and configured to provide the second feedback signal to the second input clock signal, wherein the first feedback signal is a single inversion of the first output clock signal.

9. The clock generating circuit of claim 8, wherein the voltage control circuit is configured to generate the first control voltage having the voltage level, which complementarily changes with reference to a voltage level of the power voltage, and configured to generate the second control voltage having the voltage level, which complementarily changes with reference to the voltage level of the first control voltage.

10. The clock generating circuit of claim 8, wherein the voltage control circuit includes:

a bias generating circuit configured to generate a first bias voltage having a constant voltage level regardless of the voltage level change of the power voltage and configured to generate a second bias voltage having a varying voltage level according to the voltage level change of the power voltage; and a control voltage generating circuit configured to generate the first control voltage and the second control voltage having the voltage levels varying in proportion to voltage level difference between the first bias voltage and the second bias voltage.

11. The clock generating circuit of claim 10, wherein the control voltage generating circuit includes:

an amplifier including a positive input node receiving the second bias voltage and a negative input node receiving an output voltage, the amplifier configured to generate the output voltage;

an inverting amplifier including a positive input node receiving the first bias voltage and a negative input node receiving the output voltage, the inverting amplifier configured to generate the first control voltage; and a voltage driver configured to generate the second control voltage having the voltage level, which complementarily changes with reference to a voltage level change of the first control voltage.

12. The clock generating circuit of claim 8, wherein the first compensating circuit includes at least one inverter configured to invert the first output clock signal to generate the first feedback signal and configured to provide the first feedback signal to the first input clock signal, wherein a driving force with which the at least one inverter drives the first feedback signal is adjusted on a basis of the first control voltage and the second control voltage.

13. The clock generating circuit of claim 8, wherein the second compensating circuit includes at least one inverter configured to invert the second output clock signal to generate the second feedback signal and configured to provide the second feedback signal to the second input clock signal, wherein a driving force with which the at least one inverter drives the second feedback signal is adjusted on a basis of the first control voltage and the second control voltage.

14. A semiconductor apparatus including a clock distribution network,
wherein the clock distribution network includes:
a clock receiving circuit configured to receive an external clock signal and a complementary external clock signal to generate a first input clock signal and a second input clock signal;
a first buffer circuit configured to non-invert the first input clock signal to generate a first output clock signal;
a second buffer circuit configured to non-invert the second input clock signal to generate a second output clock signal;
a voltage control circuit configured to detect a voltage level change of a power voltage and configured to generate a first control voltage and a second control voltage, the first control voltage and the second control voltage having varying voltage levels according to the detected voltage level change;
a first compensating circuit configured to invert the first output clock signal according to the first and second control voltages to generate a first feedback signal using a single inversion stage, and configured to provide the first feedback signal to the first input clock signal;
a second compensating circuit configured to invert the second output clock signal according to the first and second control voltages to generate a second feedback signal, and configured to provide the second feedback signal to the second input clock signal; and
a dividing circuit configured to divide the first output clock signal and the second output clock signal to generate a plurality of internal clock signals,
wherein the first feedback signal is a single inversion of the first output clock signal.

15. The semiconductor apparatus of claim 14, wherein the voltage control circuit includes:

a bias generating circuit configured to generate a first bias voltage having a constant voltage level regardless of the voltage level change of the power voltage and configured to generate a second bias voltage having a varying voltage level according to the voltage level change of the power voltage; and
a control voltage generating circuit configured to generate the first control voltage and the second control voltage having the voltage levels varying in proportion to voltage level difference between the first bias voltage and the second bias voltage.

16. The semiconductor apparatus of claim 15, wherein the control voltage generating circuit includes:
an amplifier including a positive input node receiving the second bias voltage and a negative input node receiving an output voltage, the amplifier configured to generate the output voltage;
an inverting amplifier including a positive input node receiving the first bias voltage and a negative input node receiving the output voltage, the inverting amplifier configured to generate the first control voltage; and
a voltage driver configured to generate the second control voltage having the voltage level, which complementarily changes with reference to a voltage level change of the first control voltage.

17. The semiconductor apparatus of claim 14, further comprising:
a first data receiving circuit configured to receive first data through a first data bus; and
a first parallelizer configured to synchronize the first data to the plurality of internal clock signals to generate a plurality of first internal data signals.

18. The semiconductor apparatus of claim 17, further comprising:
a second data receiving circuit configured to receive second data through a second data bus; and
a second parallelizer configured to synchronize the second data to the plurality of internal clock signals to generate a plurality of second internal data signals.

* * * * *